(12) United States Patent
Lin

(10) Patent No.: US 7,848,629 B2
(45) Date of Patent: Dec. 7, 2010

(54) AUTO-FOCUS SYSTEM AND AUTO-FOCUS METHOD THEREOF

(75) Inventor: Cing-Shin Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 128 days.

(21) Appl. No.: 12/346,794

(22) Filed: Dec. 30, 2008

(65) Prior Publication Data
US 2010/0080546 A1     Apr. 1, 2010

(30) Foreign Application Priority Data
Sep. 26, 2008     (CN) .................... 2008 1 0304687

(51) Int. Cl.
G03B 15/03     (2006.01)
(52) U.S. Cl. ..................... 396/106; 396/157
(58) Field of Classification Search ............ 396/98, 396/106, 157
See application file for complete search history.

(56) References Cited

U.S. PATENT DOCUMENTS

| | | | |
|---|---|---|---|
| 5,204,710 A * | 4/1993 | Tsukamoto et al. ........... 396/85 |
| 6,259,514 B1 * | 7/2001 | Yoshida ................. 356/3.04 |
| 6,711,352 B2 * | 3/2004 | Kohno et al. ............... 396/109 |
| 7,389,041 B2 * | 6/2008 | Gindele et al. .............. 396/98 |
| 7,499,636 B2 * | 3/2009 | Feng et al. ................. 396/61 |
| 2003/0197806 A1 * | 10/2003 | Perry et al. ............... 348/370 |
| 2006/0216012 A1 * | 9/2006 | Kuo et al. ................. 396/106 |
| 2007/0280660 A1 * | 12/2007 | Yeh et al. .................. 396/61 |

* cited by examiner

Primary Examiner—Clayton E Laballe
Assistant Examiner—Leon W Rhodes
(74) Attorney, Agent, or Firm—Zhigang Ma

(57) ABSTRACT

An exemplary auto-focus method includes the following steps. An ambient brightness is measured before a pre-flash. Then, a pre-flash ambient brightness is also measured during the pre-flash is fired. A main flash ratio is subsequently calculated using the ambient brightness, the pre-flash ambient brightness, and a preset desired brightness. Next, an object distance is indexed using the calculated main flash ratio and a table. The table includes a collection of main flash ratios and a collection of object distances, where each flash ratio is associated with a corresponding object distance. Then an image distance corresponding to the indexed object distance is calculated using the imaging formula. The calculated image distance is converted into a number of focus steps of a focus lens. Finally, the focus lens is moved with a corresponding number of focus steps.

9 Claims, 2 Drawing Sheets

AUTO-FOCUS SYSTEM AND AUTO-FOCUS METHOD THEREOF

BACKGROUND

1. Technical Field

The present disclosure relates to auto-focus (AF) techniques and, particularly, to an AF system which can determine correct focus even in dim light conditions and an AF method thereof.

2. Description of the Related Art

Digital cameras typically include an AF system to automatically focus on an object. AF systems generally include an active AF and a passive AF system. The active AF system measures distance to the object using an individual measuring system and adjusts the digital cameras for correct focus. The passive AF system determines correct focus by performing passive analysis of images of the object, which is mainly achieved by contrast measurement technique. The contrast measurement technique assumes that the intensity difference between adjacent pixels of the images naturally increases with correct focus and adjusts the digital cameras for correct focus based upon contrast values measured from the images. Commonly, focus accuracy of the active AF system is less than that of the passive AF system. However, the active AF system may also fail to focus properly on an object that is very close to the digital camera. The passive AF system also may focus improperly when contrast in the images is low, notably with monochromatic views or in low-light conditions.

Therefore, it is desirable to provide an AF system and an AF method thereof, which can overcome the above-mentioned problems.

DETAILED DESCRIPTION OF THE EMBODIMENTS

Embodiments of the present AF system and method will now be described in detail with references to the accompanying drawings. The AF system and method can be applied to a digital image capture device, such as a digital still camera, a digital video camera, or a mobile phone having a camera module.

Figure 1:
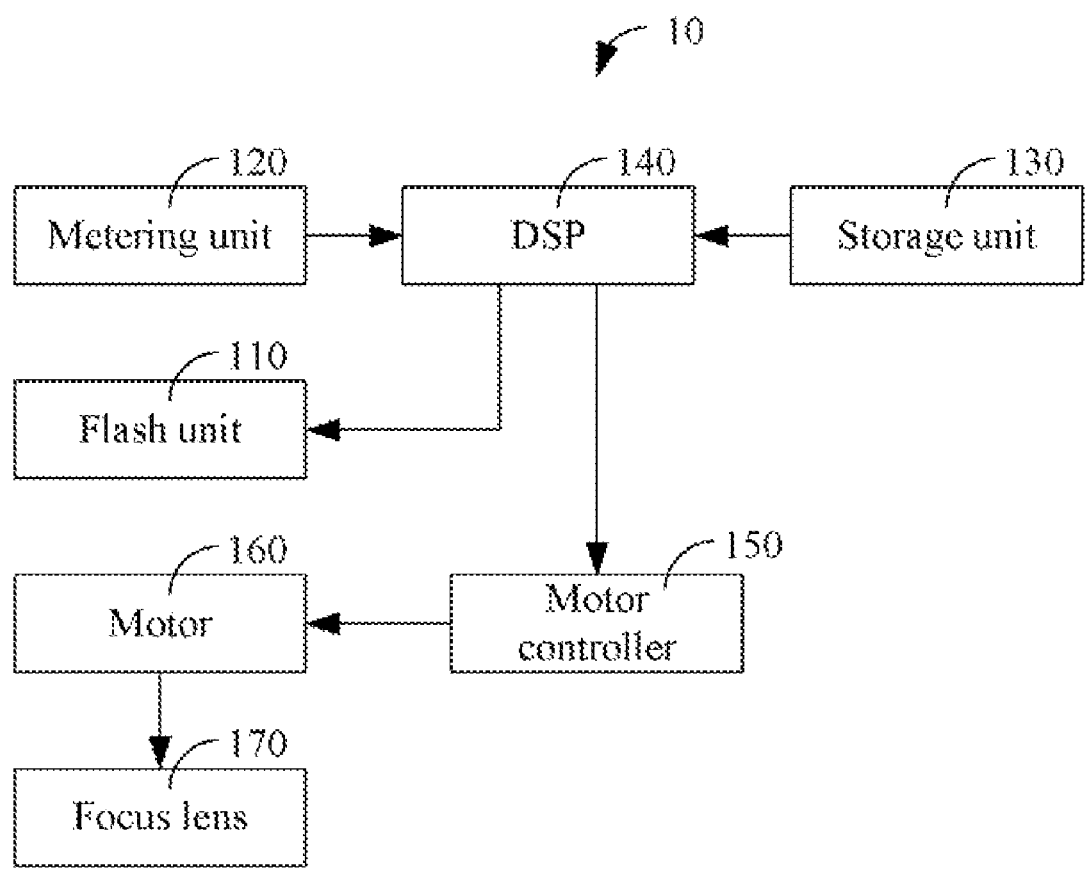
FIG. 1 is a block diagram of an AF system, according to an exemplary embodiment.

Referring to FIG. 1, an AF system 10 in accordance with an exemplary embodiment includes a flash unit 110, a metering unit 120, a storage unit 130, a digital signal processor (DSP) 140, a motor controller 150, a motor 160, and a focus lens 170.

The flash unit 110 is configured for firing a pre-flash and a main flash. The pre-flash is for red-eye reduction, white balance and other settings of the digital image capture device before shooting. The main flash is to help illuminate an object during shooting.

The metering unit 120 is configured for measuring an ambient brightness $Y_a$ before using pre-flash and a pre-flash ambient brightness $Y_p$ measured during pre-flash. The metering unit 120 can be a software module capable of measuring brightness of images captured by the digital image capture device and measuring the ambient brightness $Y_a$, and the pre-flash ambient brightness $Y_p$. Also, the metering unit 120 can be a photometer, in other alternative embodiments.

The storage unit 130 is for storing a preset desired brightness $Y_d$ for the captured images and a main flash table. The main flash table can be pre-built by manufacturers based upon results of conducted experiments and is used to determine parameters of the main flash such as how long to flash to achieve an image with the desired brightness $Y_d$. An example of the main flash table is given below:

TABLE 1

| Serial number | Object distance (cm) | Main flash ratio | Main flash duration (microsecond) |
| --- | --- | --- | --- |
| 1 | 20 | 10 | 440 |
| 2 | 30 | 30 | 560 |
| 3 | 40 | 50 | 660 |
| 4 | 50 | 58 | 745 |
| 5 | 60 | 60 | 765 |
| 6 | 70 | 62 | 800 |
| 7 | 80 | 64 | 830 |
| 8 | 90 | 66 | 850 |
| 9 | 100 | 68 | 870 |
| 10 | 110 | 70 | 900 |
| 11 | 120 | 75 | 930 |
| 12 | 130 | 80 | 960 |
| 13 | 140 | 90 | 1020 |
| 14 | 150 | 100 | 1100 |
| 15 | 160 | 120 | 1170 |
| 16 | 170 | 140 | 1250 |
| 17 | 180 | 160 | 1340 |
| 18 | 190 | 180 | 1430 |
| 19 | 200 | 200 | 1540 |
| 20 | 210 | 250 | 1670 |
| 21 | 220 | 300 | 1830 |
| 22 | 230 | 350 | 2030 |
| 23 | 240 | 400 | 2250 |
| 24 | 250 | 500 | 2520 |
| 25 | 260 | 600 | 2850 |
| 26 | 270 | 700 | 3200 |
| 27 | 280 | 800 | 3600 |
| 28 | 290 | 900 | 4100 |
| 29 | 300 | 1000 | 4600 |
| 30 | 310 | 1200 | 5300 |
| 31 | 320 | 1400 | 6200 |
| 32 | 330 | 1600 | 7200 |
| 33 | 340 | 1800 | 8300 |
| 34 | 350 | 2000 | 9500 |
| 35 | 360 | 2250 | 11000 |
| 36 | 370 | 2500 | 13000 |
| 37 | 380 | 2750 | 17000 |
| 38 | 390 | 3000 | 24000 |
| 39 | 400 | 3500 | 60000 |

The DSP 140 is configured for calculating a main flash ratio $R_m$ suitable for current ambient light conditions using the formula:

$$R_m = \frac{Y_d - Y_p}{Y_p - Y_a}$$

and indexing a corresponding object distance p using Table 1. The DSP 140 is also configured for calculating an image distance q from the lens to the image plane corresponding to the indexed object distance p using the imaging formula:

$$\frac{1}{p} + \frac{1}{q} = \frac{1}{f},$$

where f is the focal length of the AF system 10. Furthermore, the DSP 140 is configured for converting the calculated image distance q into a corresponding number of focus steps Z required to move the focus lens 170 from a default position to focus on the object distance p, using the formula: q=(Z−X)×t×M×f, where X is the number of focus steps required to move the focus lens 170 to focus on infinity, t is the distance that the focus lens 170 move in one focus step, and M is the magnification ratio of the AF system 170.

The motor controller 150 is configured for reading the number of focus steps Z and controlling the motor 160 to drive the focus lens 170 to move corresponding number of focus steps. Thereby, the AF system 10 is focused on the object.

Figure 2:
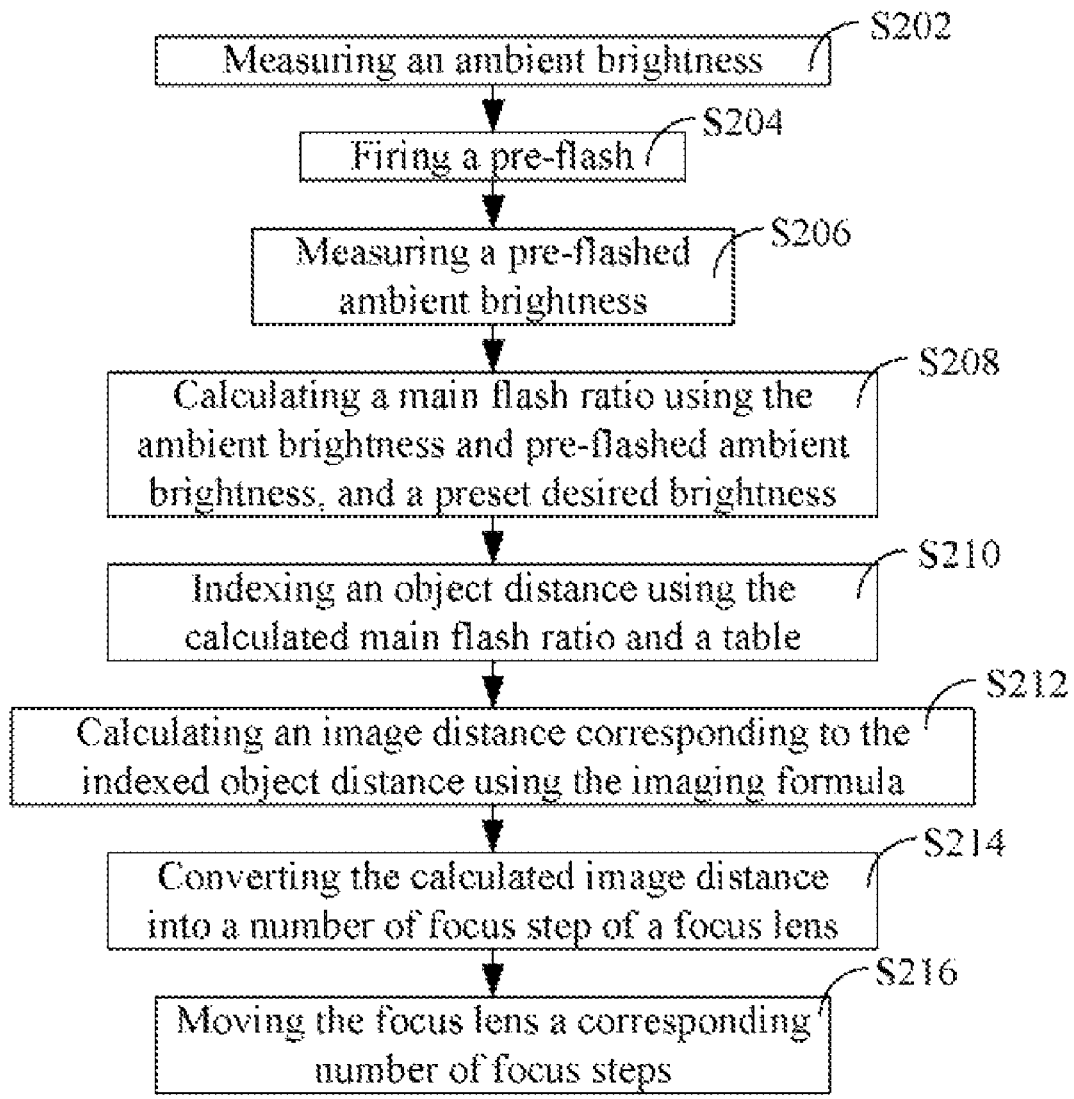
FIG. 2 is a flowchart of an AF method, according to another exemplary embodiment.

Referring to FIG. 2, an AF method can be exemplarily implemented by the AF system 10, according to an exemplary embodiment, and includes the following steps S202-S216.

Step 202: measuring an ambient brightness $Y_a$ before using pre-flash. In detail, this step can be carried out by the metering unit 120.

Step 204: firing a pre-flash. In particular, this step can be carried out by the flash unit 110.

Step 206: measuring a pre-flash ambient brightness $Y_p$ during the pre-flash. This step can be carried out by the metering unit 120.

Step 208: reading a preset desired brightness $Y_d$, and calculating a main flash ratio $R_m$ suitable for current ambient light conditions using the formula:

$$R_m = \frac{Y_d - Y_p}{Y_p - Y_a}.$$

This step can be finished by the DSP 140. The preset desired brightness $Y_d$ is stored in the storage unit 130.

Step 210: indexing a corresponding object distance p using the calculated main flash ratio $R_m$ and a main flash table. In this embodiment, this step is also finished by the DSP 140. The main flash table is Table 1 (see above). In practice, the calculated main flash ratio $R_m$ may not exactly equal to the ratios listed in the table. Therefore, more algorithms are needed to solve this issue. For example, if the calculated main flash ratio $R_m$ falls into a range between $R_i$ and $R_{i-1}$, the object distance p is determined by the formula:

$$\frac{p - p_{i-1}}{p_i - p_{i-1}} = \frac{R_m - R_{i-1}}{R_i - R_{i-1}},$$

where i is the serial number of Table 1, $R_i$ and $R_{i-1}$ are ratios in the ith and (i−1)th lines of Table 1 respectively, $p_i$ and $p_{i-1}$ are the object distances in the ith and (i−1)th lines of Table 1 respectively.

Step 212: calculating an image distance q corresponding to the indexed object distance p using the imaging formula:

$$\frac{1}{p} + \frac{1}{q} = \frac{1}{f},$$

where f is the focal length of the AF system 10. This step is also carried out by the DSP 140.

Step 214: converting the calculated image distance q into a corresponding number of focus steps Z of the focus lens 170 using the formula: q=(Z−X)×t×M×f, where X is the number of focus steps of the focus lens 170 required to move to focus on the infinity, t is the distance that the focus lens 170 moves in a focus step, and M is the magnification ratio of the AF system 10. This step is carried out by the DSP 140 too.

Step 216: driving the focus lens 170 to move based upon the number of focus steps Z. This step can be carried out by the motor controller 150 and the motor 160. For example, the motor controller 150 reads the number of focus steps Z from the DSP 140, and controlling the motor 160 to driving the focus lens 170 to move corresponding number of focus steps.

The AF system 10 and method mainly rely on the distance measurement and contrast measurement. Therefore, focus accuracy is ensured. Also, the AF system 10 and method can be used in macro focus and low light conditions too.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An auto-focus system for use in an image capture device, comprising:
   a focus lens;
   a motor;
   a flash unit for firing a pre-flash;
   a metering unit configured for measuring an ambient brightness before the pre-flash and a pre-flash ambient brightness during the pre-flash;
   a storage unit for storing a preset desired brightness and a table, the table comprising a collection of main flash ratios and a collection of object distances, where each main flash ratio is associated with a corresponding object distance;
   a digital signal processor configured for calculating a main flash ratio using the formula:

$$R_m = \frac{Y_d - Y_p}{Y_p - Y_a},$$

where $R_m$ is the main flash ratio, $Y_d$ is the preset desired brightness, $Y_p$ is the pre-flash ambient brightness, and $Y_a$ is the ambient brightness the digital signal processor being configured for indexing an object distance corresponding to the calculated main flash ratio using the table and calculating an image distance using the indexed object distance and a number of focus steps of focus lens using the image distance; and a motor controller configured for reading the calculated number of focus steps of the focus lens and controlling the motor to drive the focus lens to move the corresponding number of focus steps.

2. The auto-focus system as claimed in claim 1, wherein the flash unit is further configured for firing a main flash.

3. The auto-focus system as claimed in claim 1, wherein the metering unit comprises a software module capable of measuring brightness of an image captured by the image capture device.

4. The auto-focus system as claimed in claim 1, wherein the metering unit comprises a photometer.

5. The auto-focus system as claimed in claim 1, wherein the digital signal processor calculates the number of focus steps of the focus lens using the following formulas:

$$\frac{1}{p} + \frac{1}{q} = \frac{1}{f}$$

and $q=(Z-X) \times t \times M \times f$, where Z is the number of focus steps of the focus lens, p is the indexed object distance, f is the focal length of the AF system, q is an image distance corresponding to the indexed object distance, X is the number of focus steps required to move the focus lens to focus on infinity, t is the distance that the focus lens move in one focus step, and M is the magnification ratio of the AF system.

6. An auto-focus method comprising:
measuring an ambient brightness;
firing a pre-flash;
measuring a pre-flash ambient brightness during the pre-flash;
calculating a main flash ratio using the formula:

$$R_m = \frac{Y_d - Y_p}{Y_p - Y_a},$$

where $R_m$ is the main flash ratio, $Y_d$ is the preset desired brightness, $Y_p$ is the pre-flash ambient brightness, and $Y_a$ is the ambient brightness;
indexing an object distance using the calculated main flash ratio and a table, the table comprising a collection of main flash ratios and a collection of object distances, where each flash ratio is associated with a corresponding object distance;
calculating an image distance corresponding to the indexed object distance using an imaging formula;
converting the calculated image distance into a number of focus step of a focus lens; and
moving the focus lens a corresponding number of focus steps to focus.

7. The auto-focus method as claimed in claim 6, wherein the image distance is calculated by the formula:

$$\frac{1}{p} + \frac{1}{q} = \frac{1}{f},$$

where p is the indexed object distance, f is the focal length of the AF system, and q is the image distance.

8. The auto-focus method ad claimed in claim 6, wherein the object distance is indexed using the following formula when the main flash ratio is not exactly equal to ratios listed in the table:

$$\frac{p - p_{i-1}}{p_i - p_{i-1}} = \frac{R_m - R_{i-1}}{R_i - R_{i-1}},$$

where $R_m$ is the calculated main flash ratio, and $R_i$ and $R_{i-1}$ are ratios in the ith and (i−1)th lines of table, between which the calculated main flash ratio falls into, $p_i$ and $p_{i-1}$ are the object distances listed in the ith and (i−1)th lines of the table.

9. The auto-focus method as claimed in claim 6, wherein the image distance is converted into the number of focus steps of the focus lens by the formula: $q=(Z-X) \times t \times M \times f$, where Z is the number of focus steps of the focus lens, f is the focal length of the AF system, q is the image distance, X is the number of focus steps required to move the focus lens to focus on infinity, t is the distance that the focus lens move in one focus step, and M is the magnification ratio of the AF system.

* * * * *